A. P. PEABODY.
BRAKE FOR VEHICLES.
APPLICATION FILED APR. 28, 1909.
934,752.
Patented Sept. 21, 1909.
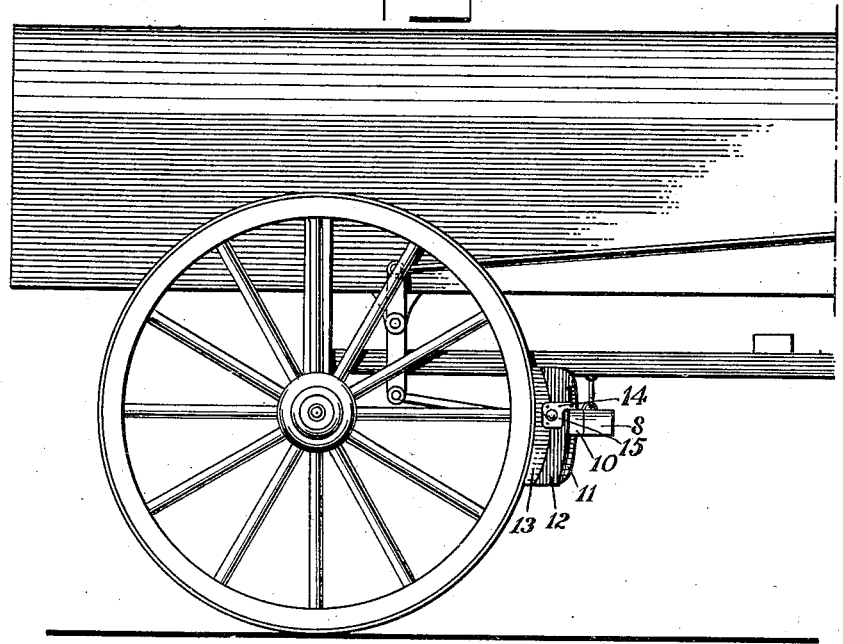
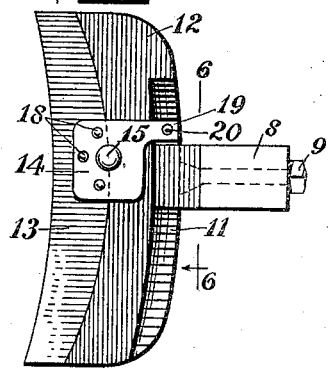
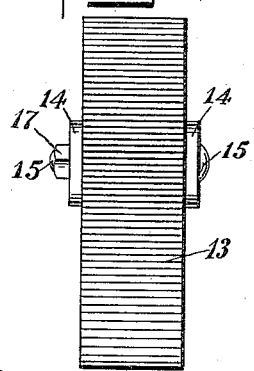
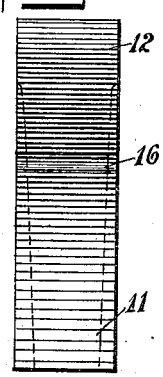
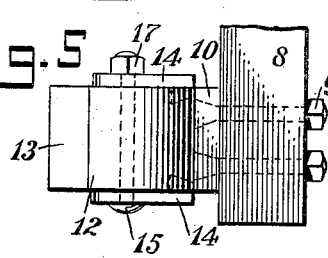
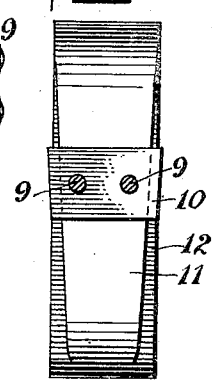
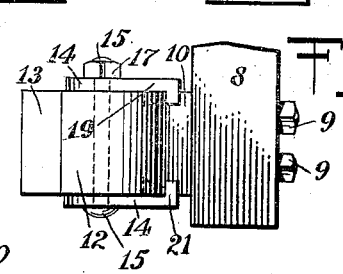
WITNESSES
INVENTOR
Albion P. Peabody
BY
ATTORNEYS

UNITED STATES PATENT OFFICE.

ALBION PERLEY PEABODY, OF CAMP VERDE, ARIZONA TERRITORY.

BRAKE FOR VEHICLES.

934,752.  Specification of Letters Patent. Patented Sept. 21, 1909.

Application filed April 28, 1909. Serial No. 492,626.

*To all whom it may concern:*

Be it known that I, ALBION PERLEY PEABODY, a citizen of the United States, and a resident of Camp Verde, in the county of Yavapai and Territory of Arizona, have invented a new and useful Brake for Vehicles, of which the following is a full, clear, and exact description.

The objects which the present invention has in view are: to provide a construction for a brake wherein the wearing shoe may be quickly and readily replaced; to provide a holding device for securing the wearing shoe to the brake, which will not become loosened; and to provide a construction for securing the said wearing shoe to the brake, which is strong, durable and simple.

One embodiment of my invention is shown in the accompanying drawings wherein like characters of reference indicate corresponding parts in all the views.

Figure 1 is a side elevation of a wagon, provided with a brake and a brake shoe held in position in accordance with my invention; Fig. 2 is a side elevation of a brake beam, a brake and a brake shoe held in position by holding devices constructed in accordance with my invention; Fig. 3 is a face view of the construction shown in Fig. 2 of the drawings; Fig. 4 is a face view of the brake head, the shoe and fastening devices for the same being removed; Fig. 5 is a top view of the construction shown in Fig. 2; Fig. 6 is a rear view of the construction shown in Fig. 2, the holding bolts for the brake bracket being shown in section on the line 6—6 in Fig. 2; and Fig. 7 is a top view of the brake beam, brake bracket, brake head and brake shoe, held to the brake head by means of devices of a modified form.

In Fig. 1 is illustrated the rear end of an ordinary mountain road wagon, equipped with the usual brake appliances and mountings. The brake beam 8 in the majority of constructions at present in use, is perforated to receive fastening bolts 9, the heads of which are countersunk in a bracket 10. The bracket 10 is provided with two extensions which are undercut as shown in dotted lines in Fig. 5 of the drawings. The said extensions where they are under-cut are formed to converge at the bottom to produce a wedge-shaped slot as shown by dotted lines in Fig. 6 of the drawings. The extensions thus under-cut and converged form a tapering slot, having a dovetail recess to receive and hold a wedge-shaped extension 11, formed on the back of the brake head, as shown more particularly in Figs. 2 and 6.

In mounting the brake head 12, the extension 11 is inserted within the dovetail slot formed by the extensions in the brake bracket, and the head is driven downward until firmly seated in the slot. The torsional strain of the wheel upon the brake head is in the majority of instances downward, tending to set the extension 11 of the brake head more firmly within the slot and more firmly secure the engagement of the brake head upon the bracket 10. As stated, this construction is common to the majority of standard makes of wagons of the present day.

It is intended that in all instances the brake head 12 should be provided with some sort of wearing shoe. The brake head is usually constructed of hard wood, whereas the wearing shoe 13 is formed from a softer material, that used in the present instance being by preference, wood. The face of the brake head 12 is formed to a shorter curve than the face of the shoe 13. By this means the dislodging tendency of the braking strain exerted by the wheel upon the shoe 13 is transferred to the brake head 12, and not to the fastening devices.

To secure the brake shoe upon the head 12 so that the same will not become dislodged therefrom, I have provided the side plates 14, which are constructed preferably from malleable iron. The plates 14 rest against the sides of the shoe 13 and the head 12, and are drawn against the same by a bolt 15 which is extended through grooves formed between the surface of the shoe and head, as shown at 16 in Fig. 4. The groove 16 is duplicated in the back of the shoe 13, so that when the shoe and head are properly adjusted the two grooves will aline to form a round perforation to receive the bolt 15, the bolt 15 being tightened by a nut 17. The plates 14 may be secured to the shoe 13 by any desirable known means, that shown in the drawings in Fig. 2 being to perforate the plates 14 so that nails 18 may be driven through the said perforations into the shoe 13. The plates 14 are provided with rearward extensions 19 which are likewise perforated to receive a bolt 20 adapted to bear against the rear surface of the head 12. By means of the bolt 20 and the nails 18, the shoe 13 is prevented from separating from the head 12, while the bolt 15 extending through and seated in the grooves 16 prevents any lateral disadjustment of the shoe on the head.

In the form of the invention shown in Fig. 7, there are provided overturned ends 21 on the extensions 19, which replace the bolt 20 above described.

The operation of placing upon the head 12 the brake shoe 13 when provided with the plates 14 constructed in accordance with this invention, is as follows: The plates 14 are placed on the side of the head 12, the bolts 20 or extensions 21 being seated behind the said head, and the perforations in the plates 14 being in line with the grooves 16 in the said head. The bolt 15 is passed through from one plate to the other, extending through the grooves 16. The nut 17 is screwed lightly into position, and the shoe 13 is now inserted between the plates 14, placing the groove in the face thereof which corresponds to the groove 16 in the head 12, over the bolt 15. The fastening devices 18 are then driven into position and the nut 17 is screwed hard home. The head is now equipped with the shoe 13 and may be mounted in the bracket 10 by inserting the wedge-shaped extension 11 into the dovetail slot provided in the face of the said bracket 10, and the device is then in position for operation. The operation of a brake constructed in accordance with this invention is the same as brakes of the ordinary type.

When it becomes desirable to separate the shoe 13 from the head 12, this is accomplished by raising the head 12 out of engagement with the bracket 10 and then unscrewing the nut 17 to loosen the bolt 15 and by it relieve the tension of the plates 14 upon the sides of the head 12 and the shoe 13. The bolts 20 (if that construction be employed) will then be withdrawn and the shoe 13 carrying the plates 14 and the bolt 15 is drawn from engagement with the head 12. The plates 14, 14, may now be pried from the shoe 13 sufficiently to withdraw the fastening devices 18, by any of the well-known methods. If the construction shown in Fig. 7 be used the fastening devices 18 will be withdrawn prior to removing the shoe from the head.

Having thus described my invention, I claim as new and desire to secure by Letters Patent:

1. A brake, comprising a head having a curved face adapted to receive a removable shoe the said curved face being grooved transversely to receive a bolt, a shoe constructed of a suitable wearing material and shaped to rest within the said curved face of the said head and provided with a transverse groove to correspond with the said groove in the head to receive the same, side plates adapted to rest upon the said head and shoe and perforated to receive the said bolt, a bolt adapted to extend through the said plates and to rest within the said grooves in the head and shoe and having suitable tightening devices, and suitable devices for fastening the said shoe and the said head to the said plates.

2. A brake, comprising a head having a curved face adapted to receive a removable shoe the said face being grooved transversely to receive a bolt; a shoe constructed of a suitable wearing material and shaped to rest within the said curved face of the said head and provided with a transverse groove to correspond with the said groove in the head to receive the same bolt, side plates adapted to rest upon the said head and shoe and perforated to receive a bolt and fastening devices, a bolt adapted to extend through the said plates and to rest within the said grooves in the head and shoe and having suitable tightening devices, and fastening devices adapted to be driven through the perforations in said plates into the said shoe and to impinge upon the said head.

3. A brake, comprising a head having a wedge-shaped rear extension, the sides whereof are under cut, a brake beam provided with brackets adapted to extend within the under cut portion of said extension to hold the said head upon the said beam, a shoe constructed of a suitable wearing material adapted to rest upon the said head, side plates secured to the said shoe and having extensions adapted to infold the said head, means for securing the said extensions of said plates to the said head by extending to the rear of the same, and a bolt adapted to pass through the said plates to draw the same upon the said shoe, said bolt passing through grooves formed in both the said shoe and the said head.

4. A brake, comprising a head having a curved face adapted to receive a movable shoe, the said face being grooved transversely to receive a bolt and provided with a wedge-shaped rear extension the sides whereof are under cut; a shoe constructed of a suitable wearing material shaped to fit within the said curved face of said head and provided with a transverse groove to correspond with the said groove in the head to receive the same bolt; a bracket adapted to be fixedly mounted upon the brake beam and having extensions adapted to fit within the said under cut sides of the said rear extensions, side plates fixedly secured to the said shoe and perforated to receive a bolt and adapted to infold the sides of said head, a bolt extending through the said plates and resting within the said grooves in the head and shoe adapted to be tightened upon the same, and suitable devices for fastening the said shoe to the said head adapted to pass through the said plates to the rear of the said head.

In testimony whereof I have signed my name to this specification in the presence of two subscribing witnesses.

ALBION PERLEY PEABODY.

Witnesses:
GEORGE E. LOPER,
WILLIAM STEPHENS.